United States Patent [19]
Stevenson et al.

[11] Patent Number: 5,622,644
[45] Date of Patent: *Apr. 22, 1997

[54] MIXED GAS R-12 REFRIGERATION APPARATUS

[75] Inventors: Richard Stevenson, Mesa, Ariz.; Mikhail Boyarsky, Moscow Region, Russian Federation; Boris V. Yudin, Moscow Region, Russian Federation; Oleg N. Podcherniev, Moscow Region, Russian Federation

[73] Assignee: Intercool Energy, Latham, N.Y.

[*] Notice: The term of this patent shall not extend beyond the expiration date of Pat. No. 5,425,890.

[21] Appl. No.: 449,092

[22] Filed: May 24, 1995

Related U.S. Application Data

[63] Continuation-in-part of Ser. No. 180,208, Jan. 19, 1994, Pat. No. 5,425,890.
[51] Int. Cl.$^6$ .................................................... C09K 5/04
[52] U.S. Cl. ................................................ 252/67; 62/114
[58] Field of Search ................................. 252/67; 62/114

[56] References Cited

U.S. PATENT DOCUMENTS

| 4,482,465 | 11/1984 | Gray | 252/67 |
| 5,425,890 | 6/1995 | Yudin et al. | 252/67 |
| 5,458,798 | 10/1995 | Lunger et al. | 252/67 |

FOREIGN PATENT DOCUMENTS

| 1-139675 | 6/1989 | Japan. |
| 1-139684 | 6/1989 | Japan. |
| 1-141982 | 6/1989 | Japan. |
| 91/14751 | 10/1991 | WIPO. |
| 91/16390 | 10/1991 | WIPO. |

*Primary Examiner*—Christine Skane
*Attorney, Agent, or Firm*—Helfgott & Karas, PC.

[57] ABSTRACT

A mixed gas refrigerant for use as a replacement for CFC refrigerants, and specifically, for R-12, which includes at least three components including R-134a, R-124, and n-butane, with the n-butane being at least present in trace amounts and specifically between 1% and up to 4%.

2 Claims, 6 Drawing Sheets

MIXED GAS R-12 REFRIGERATION APPARATUS

This application is a continuation in part application to application Ser. No. 180,208 filed Jan. 11, 1994, now U.S. Pat. No. 5,425,890 issued on Jun. 20, 1995.

BACKGROUND OF THE INVENTION

This invention relates to mixed gas refrigerant (MR), and more particularly to mixed refrigerant for use as a replacement of an existing chlorofluorocarbon refrigerant.

Chlorinated fluorocarbon refrigerants (CFC) have been implicated in causing environmental damage. Specifically, these gases which are very inert, are released from the refrigeration systems at ground level and diffused into the upper atmosphere. Because of their inertness, the gases are able to survive without decomposition until they reach the stratosphere where they are broken down by ultraviolet radiation, releasing chlorine atoms which break down the stratospheric ozone layer. There has recently been considerable concern about reductions in stratospheric ozone levels and this has led to bans on certain CFC's such as R-12, R-11, and others.

In automobile air conditioning systems, typically R-12 has been utilized. As such has been banned for future use after a given phase-out period, alternatives have been considered. At present, the most widely used refrigerant for replacement of R-12 for automobile air conditioning use has been R-134A. While this material comprised of $C_2H_2F_4$ is ozone safe, it will not work in most existing automobile air conditioning systems using R-12 without expensive retrofitting. Various automobile manufacturers are already installing new equipment in new automobiles scheduled for future sales which will accommodate the R-134A refrigerant. However, for the many existing automobiles, the imposition of the restrictions on R-12 will require such retrofitting Knowledgeable estimates predict a costly conversion requirement to convert the air conditioning systems to make it compatible with R-134A.

Considerable efforts are being made to provide a replacement for R-12 in order to permit utilization of existing automobile air conditioning systems without unnecessary expensive retro-fitting. One type of refrigerant that has been given considerable attention are the hydrocarbons and, especially, propane. While propane has many useful thermodynamic properties which could perhaps serve as a replacement for R-12, unfortunately, its flammability prohibits its direct use. Proposals have therefore been to combine various hydrocarbons with other ingredients in order to provide an adequate mixture for replacement of R-12.

Hydrocarbon mixtures in general provide excellent thermodynamic properties for replacement of R-12, as well as other refrigerants which are being banned. However, numerous very rigorous standard exist for flammability testing and in order to meet some of the most restrictive flammability standards, it is necessary to greatly restrict the hydrocarbon content even though it may sacrifice the thermodynamic properties.

Furthermore, in designing a specific mixture, additional factors and constraints must be taken into consideration. Specifically, there are environmental safety conditions which must be met including sufficiently low ozone depletion potential, as well as sufficiently low global warming potential. Furthermore, the ultimate result should be of low toxicity.

There also exist additional constraints which must be met including material compatibility so that the resulting refrigerant will not deteriorate the material from which the systems are constructed. As to developing a replacement refrigerant, one of the most important parameters is hose penetration. Oil compatibility is also a severe problem since the oil must be a part of the air conditioning system and the gas mixture must be able to accommodate oils that are already on the market, including certain synthetic akylbenzenes and esters.

The mixed refrigerant must also be compatible with the particular equipment that is being utilized within the refrigerating system. There also exist the performance requirement so that the mixture must have its thermodynamic characteristics closely match those of the refrigerant being replaced and must have a co-efficient of performance sufficiently high to provide efficient results with the system being utilized.

An additional problem is with respect to the relationship of the boiling point of the components in a mixed gas refrigerant. When taking a blend of components, in most cases as the temperature increases, the component with the highest boiling point escapes faster and the liquid phase tends to become enriched with the components of lower boiling point. If the remaining components are of greater flammability, then even if the original composition is not of a flammable nature, the liquid phase remaining becomes of a flammable nature. Furthermore, a problem also exists in the escaping vapor phase if that is passing an environment that might cause flammability. Thus, the differential escape rate of the various components must be addressed to avoid having a greater amount of flammable components after evaporation of other of the components.

The above problem is even further compounded in that the situation is not consistent with all components. It is well known, that where components join to provide azeotropic mixtures, the separation between the components does not proceed in the same sequence as does the respective sequence of their decreasing boiling points. On the contrary, for azeotropic mixtures it works in reverse. Thus, the escape is not necessarily in accordance with the sequence of the boiling points of the components in the overall mixture.

Finally, there are commercial aspects, namely the components of the mixture should be relatively cheap and available on the market.

In designing mixtures to meet some of these constraints, sacrifices must be made. For example, while hydrocarbons provide good oil compatibility, they are of high flammability. On the other hand, fluorocarbons are generally of flame-retardant capabilities, however, they present problems with oil compatibility. Each of these has its own unique ozone depletion potential and global warming potential, and generally, it is required that the ozone and global problem should not be worse than the levels which may be acceptable according to the current government regulations.

In connection with the automobile air conditioning business, the flammability tests imposed are so severe that the presence of hydrocarbon itself or any other flammable material must be severely limited.

It has therefore become of significance to try and provide a replacement for R-12 in order to avoid the necessity of redesigning and retrofitting existing air conditioner compressors in automobiles. Numerous recommendations have thus far been made with many, many blends being suggested. While some of these provide certain of the features required, thus far most if not all of them have failed on other tests. For example, while many of them provide initial non-flammability properties, during continued testing of the rigorous flammability tests required in the automobile industry these mixtures have failed. Others have failed because they are permeable to the hoses. Accordingly, while there have been many, many suggestions, but thus far there has been no clear replacement that has been acceptable.

Additionally, because of the numerous available components that can be utilized in various mixture combinations, and because of the various percentages of utilization of each of these components, the number of possibilities is almost infinite and the ability to be able to provide an optimized replacement which satisfies all of the conditions has been a most challenging problem.

In co-pending application Ser. No. 08/180,208, assigned to the assignee of the present invention, there has been disclosed a unique refrigerant composition which has been able to satisfy the aforementioned conditions. Specifically, the refrigerant composition described comprises the basic mixture of 61–65 molar percent of tetrafluoroethane R134a ($C_2H_2F_4$); 28–32 molar percent of monochlorotetra fluoroethane R124 ($C_2HCl_4$) and 4–9 molar percent n-butane. This mixture was found to provide optimum replacement characters for existing R12 refrigerant. In another embodiment the mixture comprises 53–57 molar percent of R134a; 35–39 molar percent of R124 and 6–10 molar percent of n-butane.

SUMMARY OF THE INVENTION

Accordingly, it is an object of the present invention to provide another refrigerant which can serve as a replacement for an existing CFC refrigerant of the type subject to government restrictions because of environmental problems.

A further object of the present invention is to provide another replacement for an R-12 refrigerant, typically utilized in automobile air conditioning systems.

Yet, another object of the present invention is to provide another mixed refrigerant which can replace an existing CFC refrigerant and which provides environmental safety, material compatibility, oil compatibility, equipment compatibility, non-flammability, non-toxicity, a high co-efficient of performance and has sufficiently reasonable commercial costs.

These and other objects, features and advantages of the invention will, in part, be pointed out with particularity, and will, in part, become obvious from the following detailed description of the invention, taken in conjunction with the accompanying drawings, which form an integral part thereof.

DESCRIPTION OF THE PREFERRED EMBODIMENT

Figure 1:
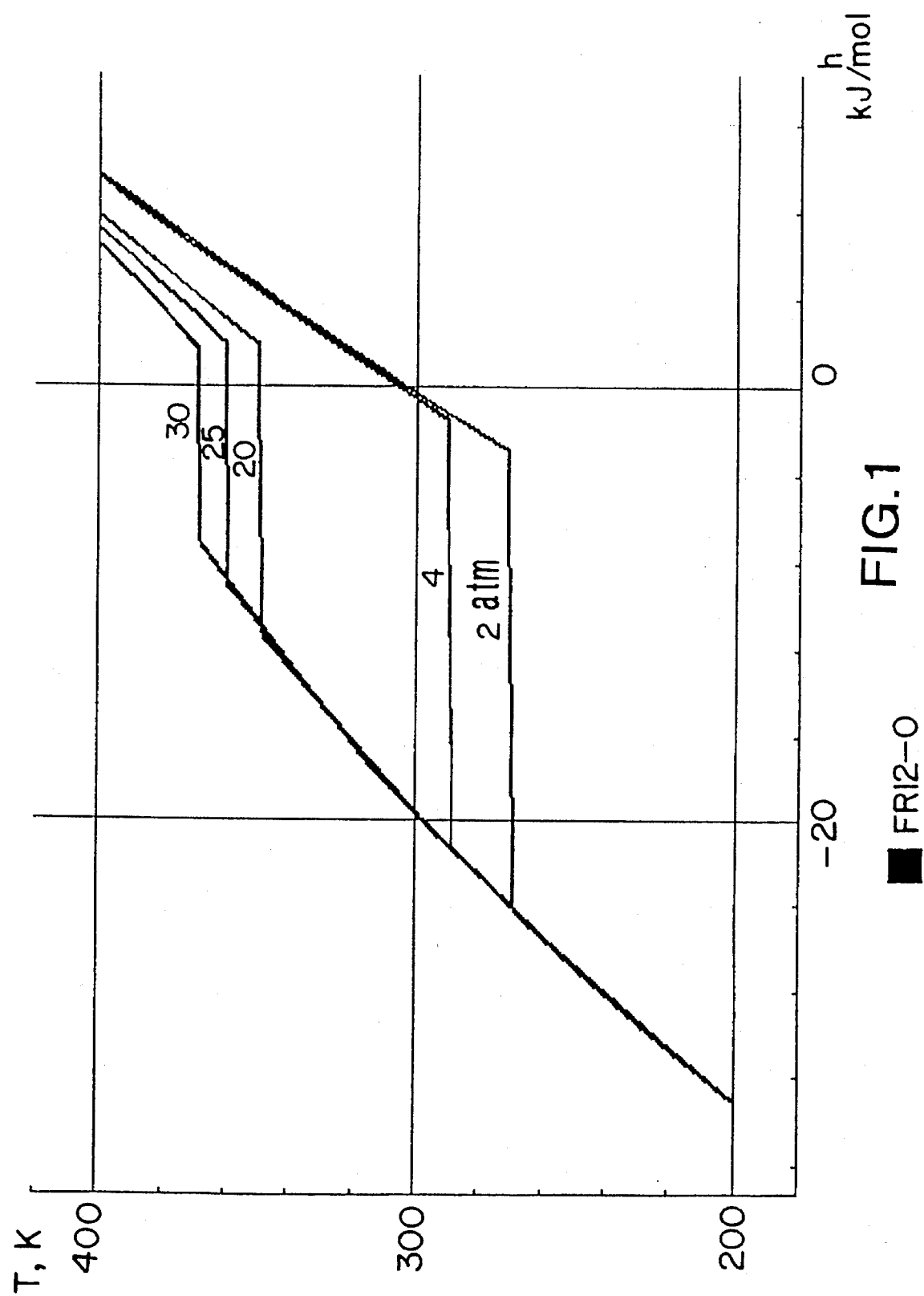
FIGS. 1–5 show thermodynamic curves of temperature versus enthalpy for 5 mixed refrigerants in accordance with the present invention.

The present invention provides for a mixed gas refrigerant which can serve as a replacement for CFC refrigerants and, specifically, is useful for replacement of the R-12 refrigerant. The present invention recognizes that there are numerous constraints that must be addressed and that no single component provides an adequate coverage to meet all of the constraints. Specifically, these constraints include the environmental safety constraints which include the ozone depletion potential, global warming potential, and low toxicity. Also to be addressed are the material compatibility aspects of the mixture such that it should not deteriorate the other components of the system. The mixed refrigerant should not leak through seals and hoses of the system. Oil compatibility is of major significance since the material must be able to work with existing oils in the equipment. Equipment compatibility is another problem which must be met by the gas mixture. Also, there should not result a flammability problem in the event of leakage of one or more of the components.

The co-efficient of performance of the ultimate product must be such that the thermodynamic characteristics of the ultimate gas mixture must meet those of the refrigerants being replaced and it must operate efficiently. Of course the commercial aspects are such that the components of the mixture should be relatively reasonable in cost and available on the market.

A very serious problem is the flammability problem. Although there exist numerous flammability tests, and while some of the tests can be net with a minimal amount of non-flammable components, others tests are more stringent and require even more limited amounts of non-flammable components. It is thus necessary to restrict the amount of hydrocarbons present to a minimal amount and, in many cases, even delete it. However, in doing so, one loses the benefits of the oil compatibility which is provided by the hydrocarbons, as well as some of the environmental benefits provided by the hydrocarbons. Likewise, hose compatibility is aided by the presence of the hydrocarbons.

Accordingly, by reducing or eliminating the hydrocarbon presence in a mixed refrigerant replacement for R-12, there is extreme difficulty in meeting all of the constraints and, at the same time, providing good thermodynamic performance.

In the previously identified co-pending U.S. application, it has been found that a unique blend of three components in specific proportion ranges has been able to meet all of the constraints and provide a replacement refrigerant for R12 automobile type refrigerants. In one of the embodiments of that application, the lowest percentage of n-butane suggested was 4 molar percent. While flammability is always a major concern and, therefore, reducing or elimination of the n-butane would be desirable, concern is that the lower the amount of n-butane, the worse the thermodynamic performance would be and that the 4 percent served as a lower limit.

It has now been unexpectedly found that by lowering the amount of n-butane, the thermodynamic performance of this three component mixture can still be maintained within adequate performance limits. In fact, reducing it down from 4% to 1% still provides a good thermodynamic substitute. Furthermore, it was unexpectedly found that so long as there is at least a trace of the n-butane present, that oil compatibility was provided. Unexpectedly, it was found that once the entire n-butane was removed, the oil formed a conglomeration with the refrigerant, which effectively stopped operation of the system to totally remove all refrigerating effects.

Accordingly, it was unexpectedly found that so long as there is a trace of the n-butane, even as little as 1%, oil compatibility was enabled and adequate thermodynamic properties were achieved. The absence of the n-butane provided total incompatibility and total inoperability of the compressor.

It should be noted that percentages herein always refer to molar concentrations, unless otherwise specified.

Figure 2:
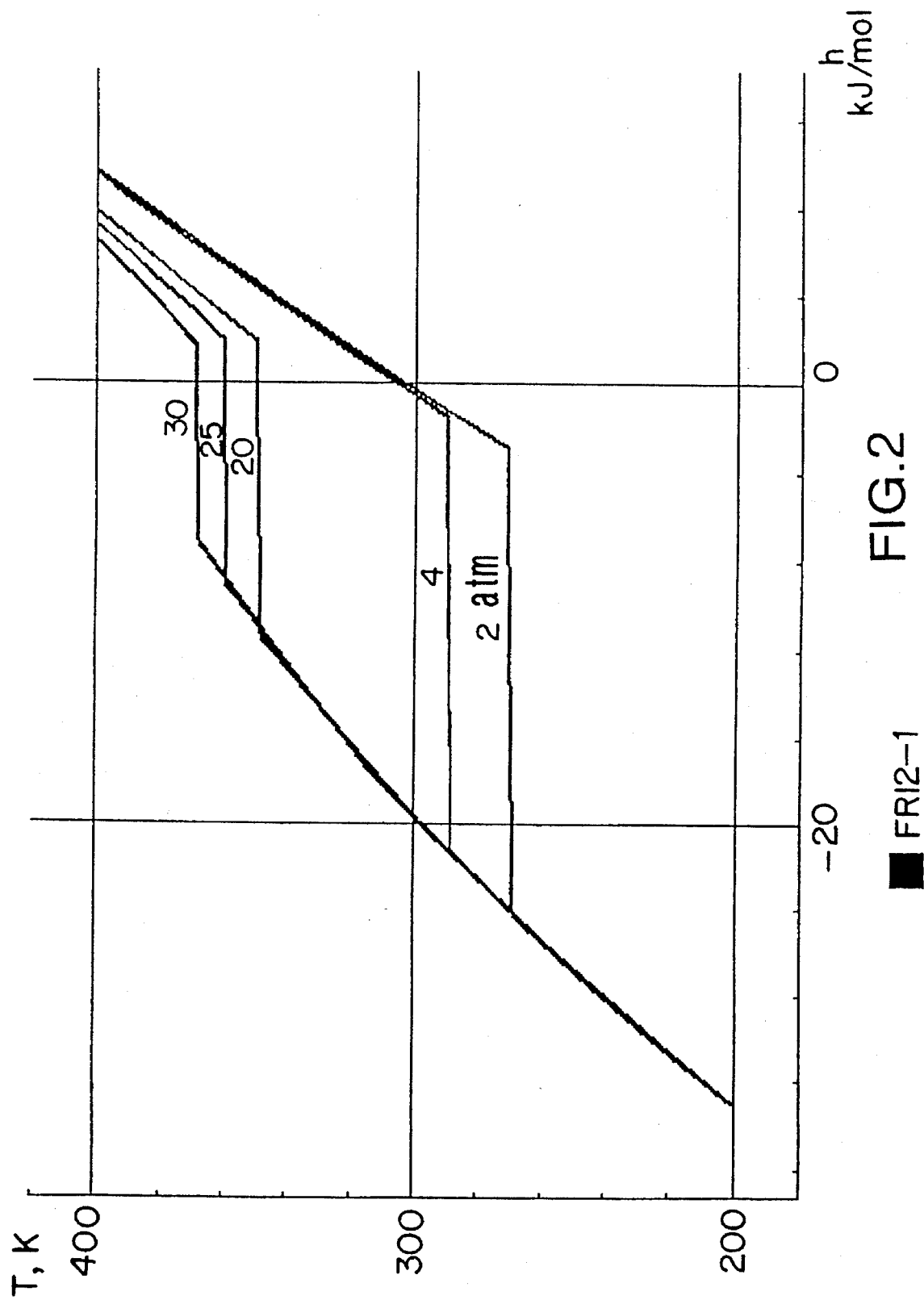
Figure 3:
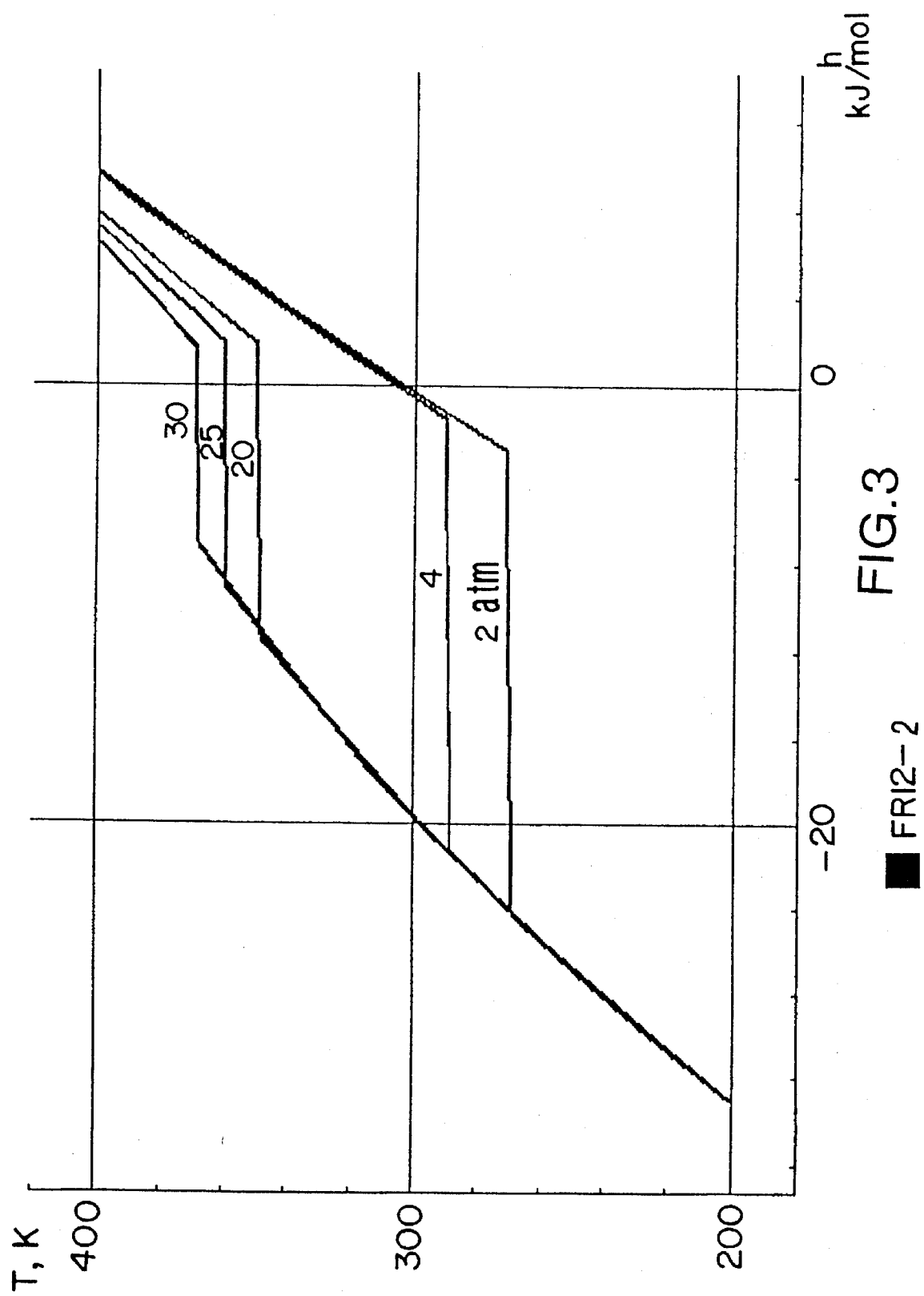
Figure 4:
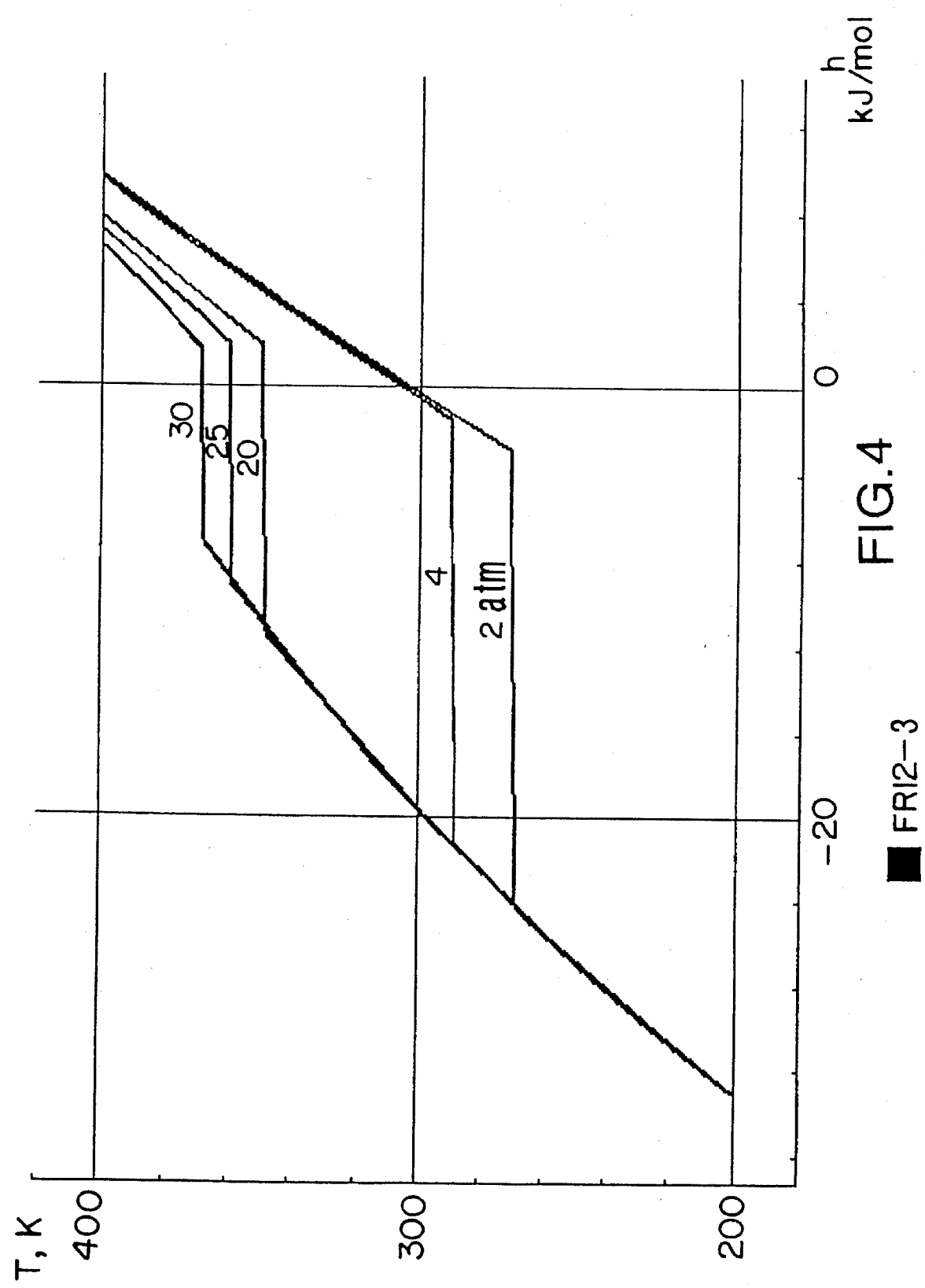
Figure 5:
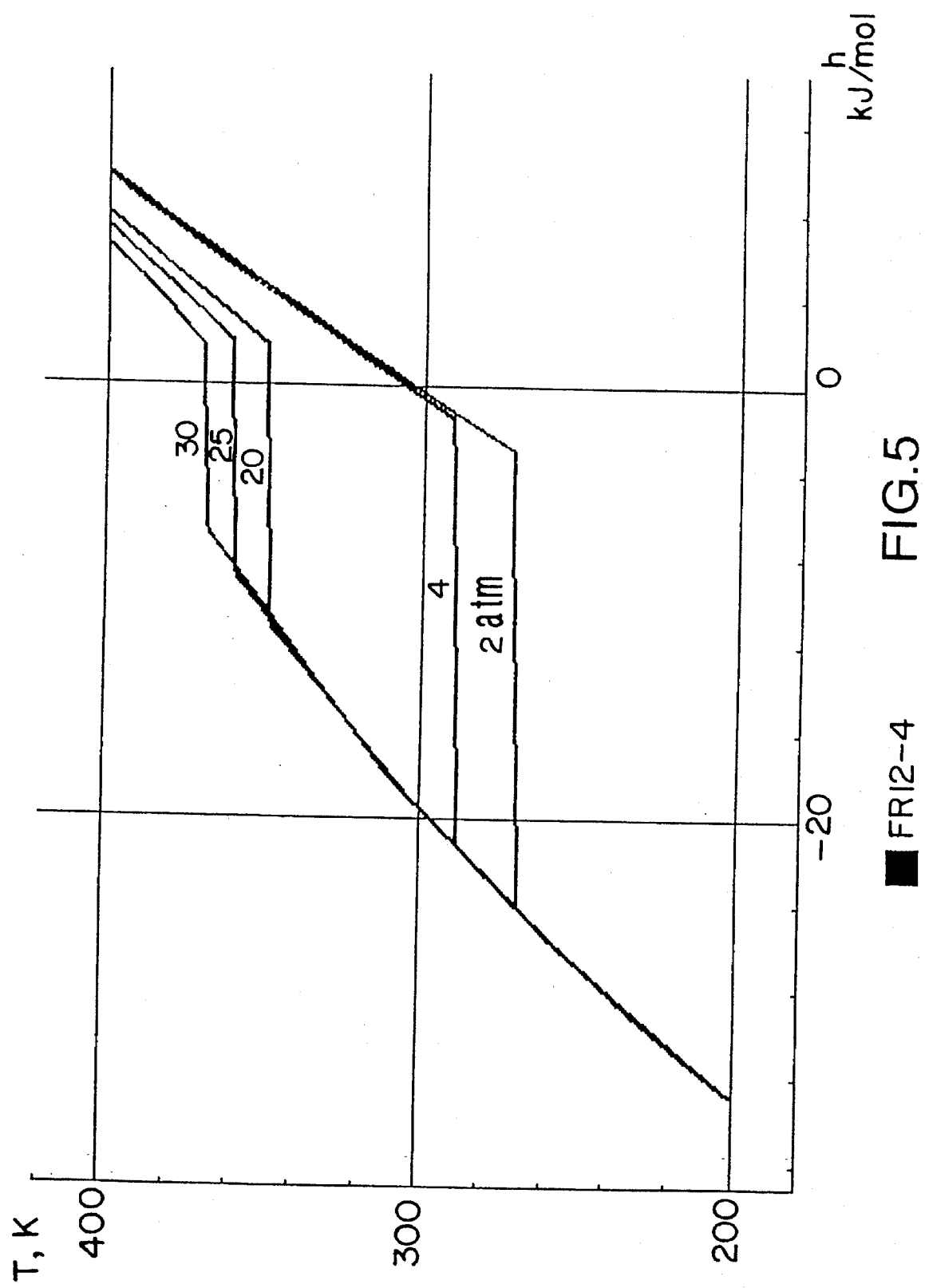
Figure 6:
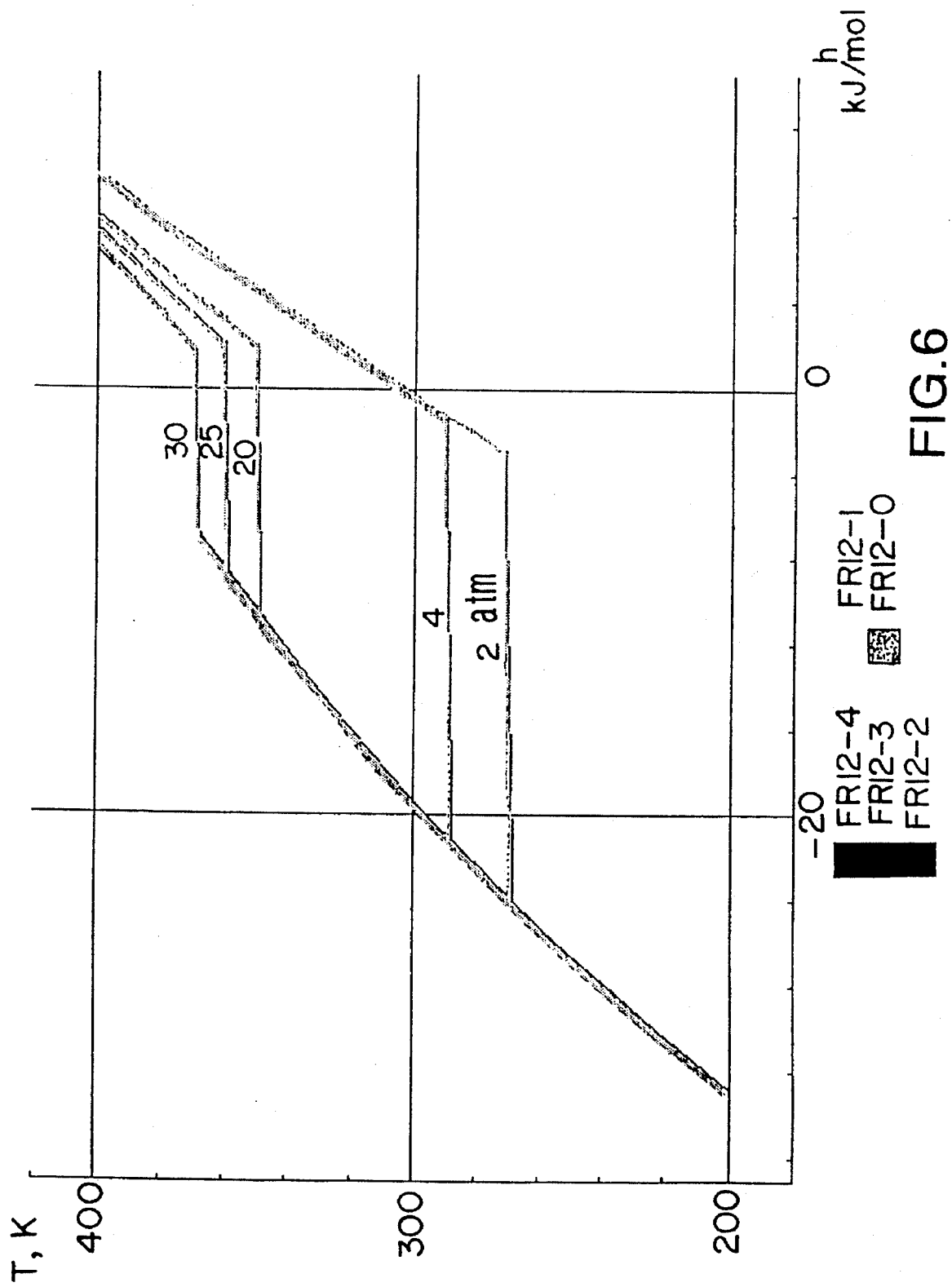
FIG. 6 shows a conglomerate of the curves of FIGS. 1–5.

More particularly, there is shown in FIGS. 1–6 sets of isobars for a series of mixtures identified as FR12 in accordance with the present invention. Each of the FR12 references comprise refrigerants of R134a at approximately 64%, R124 at approximately 32% and the presence of R600 (n-butane) in the presence of 4% or less. Thus, FR12-4 represents 4% of n-butane, FR12-3 represents 3% of n-butane, FR12-2 represents 2% of n-butane, FR12-1 represents 1% of n-butane and FR12-0 represents the absence of butane.

Each of the mixtures having a reduced amount of butane is compensated by the additional percentages of either the R134a or R124. Thus, in the present mixture the compositions that are covered are as follows:

R134a - 64–68%

R124 - 32–36% n-butane 1–4%

From the enclosed Figures, it is noted that there are provided a set of the isobars running from 2 atmospheres to 30 atmospheres. It is noted that the enthalpy-temperature characteristics are very close to each other over the whole range of pressures and over the range of composition. This fact was also shown in actual test data which showed very little differences in the thermodynamic performance of these mixtures with the change in content of the butane between 0 and 4%. While the thermodynamic performance at 4% may be slightly better, lower than 4% still provides adequate thermodynamic performance.

What was unexpectedly found was that so long as there was the presence of the n-butane in the actual refrigeration system of at leas 1%, that the system was able to operate. However, when it was attempted to operate the FR12 without n-butane, the mixture was utterly incompatible with the mineral oil lubricant used in the refrigeration compressor. The refrigeration mixture and oil formed a yellow buttery conglomeration in the form of lumps which could be separated out and picked up by the fingers and rubbed. The compressor operation became erratic with wide surges in the discharge pressure. At the same time, the refrigeration effect disappeared.

Accordingly, it was surprisingly found that while each of the refrigerants FR12-0 to FR12-4 provided acceptable thermodynamic results and could be used as substitutes for R12 refrigeration, these refrigerants were all compatible with mineral oil in the compressor only as long as the n-butane had at least 1% molar concentration level. No separation of oil refrigerant was observed and no major differences were observed in the operation of the compressor, so long as there was at least the 1% molar concentration level of the n-butane.

It should be noted that at the 1% molar concentration level, the weight fraction of the butane is 0.005. Thus, the butane is truly present in only trace quantities. Nevertheless, it is evident that the presence of the n-butane is in the form of an enabler so that even if trace quantities are there, it allows an otherwise incompatible refrigerant to operate perfectly with mineral oil in the compressor. This was extremely surprising.

Although to a great extent only minor thermodynamic differences were found as the n-butane was reduced from 4% down to 1%, it was noted that there were changes occurring in the solution itself. Specifically, the following provides a comparison of the dew point pressures for the mixtures as the concentrations were reduced:

| n-butane concentration mole % | dew point pressure (psia) at 0° C. |
| --- | --- |
| 3 | 39.9 |
| 2 | 40.0 |
| 1 | 41.5 |

It is noted that at 1% concentration, the dew point pressure is 1.5 psi above that for the other concentrations. This deviation is indicative that the nature of the solution is already starting to change. It appears that since the amount of butane is small, the n-butane is starting to lose its interaction effect on the other components. Presumably, so long as there is a trace of the n-butane, this interaction does take place. This permits compatibility with the oil.

There has been disclosed heretofore the best embodiments of the invention presently contemplated. However, it is to be understood that various changes and modifications may be made thereto without departing from the spirit of the invention.

We claim:

1. A refrigerant composition for use as a substitute for R-12 in R-12 refrigeration apparatus, comprising a mixture of:

(i) 64–68 molar % of R-134a;

(ii) 32–36 molar % of R-124, and (iii) 3–4 molar % of n-butane.

2. A refrigerant composition for use as a substitute for R-12 in R-12 refrigeration apparatus, comprising a mixture of:

(i) 64–68 molar % of R-134a;

(ii) 32–36 molar % of R-124, and (iii) 1–2 molar % of n-butane.

* * * * *